(12) United States Patent
Ho et al.

(10) Patent No.: US 11,431,138 B2
(45) Date of Patent: Aug. 30, 2022

(54) BATTERY CONNECTOR ADAPTER

(71) Applicant: DHC Specialty Corp., Taipei (TW)

(72) Inventors: Pai-Yuan Ho, Taipei (TW); Yu-Chieh Cho, Taipei (TW)

(73) Assignee: DHC Specialty Corp., Taipei (TW)

( * ) Notice: Subject to any disclaimer, the term of this patent is extended or adjusted under 35 U.S.C. 154(b) by 329 days.

(21) Appl. No.: 16/877,597

(22) Filed: May 19, 2020

(65) Prior Publication Data

US 2021/0313752 A1    Oct. 7, 2021

(30) Foreign Application Priority Data

Apr. 7, 2020 (TW) .................................. 109111661

(51) Int. Cl.
| | |
|---|---|
| *H01R 31/06* | (2006.01) |
| *H02J 7/00* | (2006.01) |
| *H01M 50/581* | (2021.01) |
| *H01M 10/42* | (2006.01) |
| *H01M 10/48* | (2006.01) |
| *H01R 13/66* | (2006.01) |
| *H01R 13/68* | (2011.01) |

(52) U.S. Cl.
CPC ........ *H01R 31/065* (2013.01); *H01M 10/425* (2013.01); *H01M 10/486* (2013.01); *H01M 50/581* (2021.01); *H01R 13/6683* (2013.01); *H01R 13/68* (2013.01); *H02J 7/00032* (2020.01); *H02J 7/0047* (2013.01); *H01M 2010/4271* (2013.01); *H01M 2200/103* (2013.01)

(58) Field of Classification Search
None
See application file for complete search history.

(56) References Cited

U.S. PATENT DOCUMENTS

| | | | | |
|---|---|---|---|---|
| 4,885,524 A | * | 12/1989 | Wilburn | H01M 50/543 |
| | | | | 320/DIG. 15 |
| 2009/0091292 A1 | * | 4/2009 | Nippear | H02J 7/0045 |
| | | | | 320/111 |

* cited by examiner

*Primary Examiner* — Karie O'Neill Apicella
(74) *Attorney, Agent, or Firm* — Alan D. Kamrath; Karin L. Williams; Mayer & Williams PC

(57) ABSTRACT

A battery connector adapter includes a housing, a positive electrode terminal, a negative electrode terminal, two positive electrode connectors and two negative electrode connectors. The positive electrode terminal, the negative electrode terminal, the two positive electrode connectors, and the two negative electrode connectors are disposed in the housing. The two positive electrode connectors are electrically connected to the positive electrode terminal respectively by the two first transmission lines. The two negative electrode connectors are electrically connected to the negative electrode terminal respectively by the two second transmission lines, wherein the two first transmission lines and the two second transmission lines are disposed in the housing.

17 Claims, 10 Drawing Sheets

BATTERY CONNECTOR ADAPTER

BACKGROUND OF THE INVENTION

1. Field of the Invention

The invention relates to a connector adapter, and particularly to a battery connector adapter.

2. Description of the Related Art

A rechargeable battery is an electronic device widely applied in various fields, and not only needs to be charged but also needs to be tested.

Please refer to FIG. 1A and FIG. 1B, which are circuit diagrams of a conventional rechargeable battery B during charging and testing. For charging the rechargeable battery B, the positive terminal and the negative terminal of the rechargeable battery B need to be connected to the positive terminal and the negative terminal of the battery charger C through two transmission lines. For testing the rechargeable battery B, the positive terminal and the negative terminal of the rechargeable battery B need to be connected to the positive terminals and the negative terminals 13, 14, 15, 16 of the test instrument T through four transmission lines.

However, the test instrument T for testing the rechargeable battery B mostly uses a four-line structure wire set of Kelvin connection to obtain higher accuracy, but the battery charger C does not need the four-line structure wire set. Instead, the battery charger C only needs a two-line structure wire set for being connected to the positive terminal and the negative terminal of the rechargeable battery B to charge the rechargeable battery B. Therefore, when the rechargeable battery B needs to be operated between charging and testing, the two-line structure wire set and the four-line structure wire set need to be alternatively connected to the rechargeable battery B by repeatedly plugging and un-plugging the two-line structure wire set and the four-line structure wire set. Accordingly, the structure wastes much time and is not convenient for the user.

Thereby, how to provide a battery connector adapter to solve the problem mentioned above is an urgent subject to tackle.

SUMMARY OF THE INVENTION

As aforementioned, the invention discloses a battery connector adapter, including a housing, a positive electrode terminal, a negative electrode terminal, two positive electrode connectors, and two negative electrode connectors. The positive electrode terminal, the negative electrode terminal, the two positive electrode connectors, and the two negative electrode connectors are disposed in the housing. The two positive electrode connectors are electrically connected to the positive electrode terminal respectively by the two first transmission lines, and the two negative electrode connectors are electrically connected to the negative electrode terminal respectively by the two second transmission lines. The two first transmission lines and the two second transmission lines are disposed in the housing.

When the user wants to test the rechargeable battery, the user can directly connect a test instrument to the rechargeable battery through a four-line structure wire set.

When the user wants to charge the rechargeable battery, the user can connect a battery charger to the positive electrode terminal and the negative electrode terminal of the battery connector adapter through a two-line structure wire set, and further can connect the two positive electrode connectors and the two negative electrode connectors of the battery connector adapter to the rechargeable battery through the four-line structure wire set.

In summary, the battery connector adapter of the invention provides a design of an adaptor, which facilitates the user not to repeatedly plug the four-line structure wire set in the rechargeable battery and pull the wire set from the rechargeable battery. Instead, the four-line structure wire set can be fixed on the positive electrode terminal and the negative electrode terminal of the rechargeable battery. Therefore, the actions for plugging and un-plugging are easy to perform by interconnecting the battery connector adapter of the invention, and then the user can immediately switch to connect to the battery charger or the test instrument so that the user can swiftly perform charging and testing the rechargeable battery and the accuracy for testing the rechargeable battery can be sustained.

DETAILED DESCRIPTION OF THE INVENTION

Figure 1A:
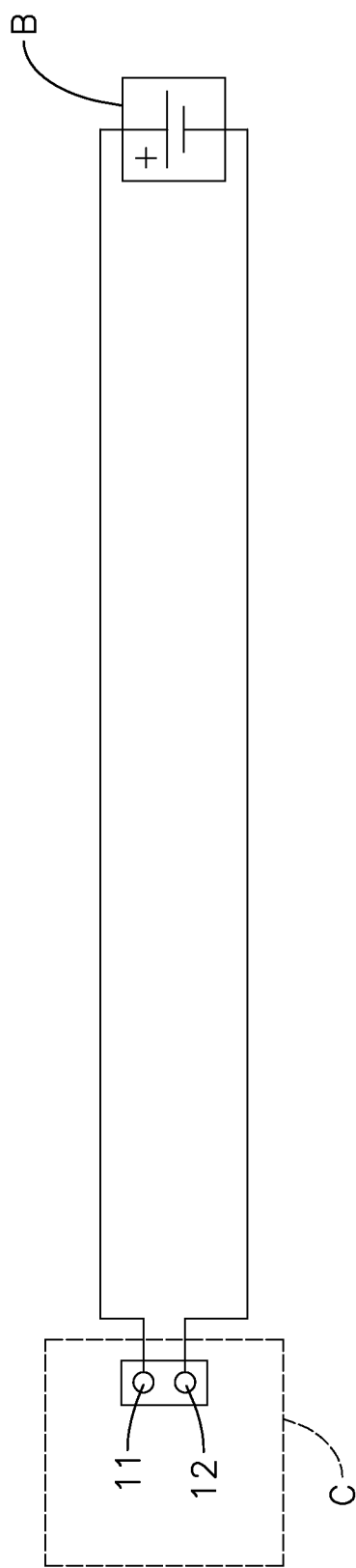
FIG. 1A and FIG. 1B are circuit diagrams of a conventional rechargeable battery performing to charge and test.
Figure 1B:
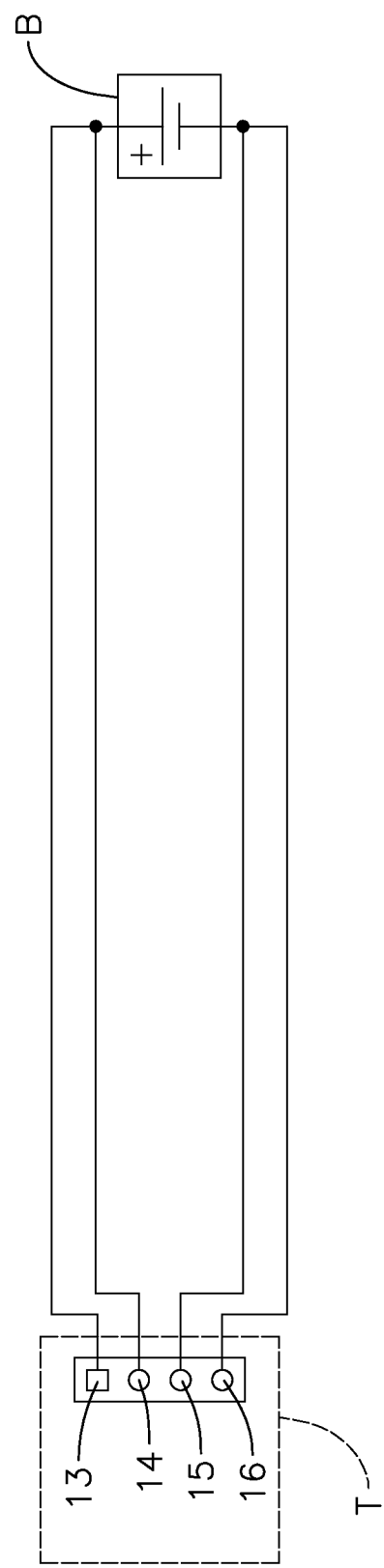
Figure 2A:
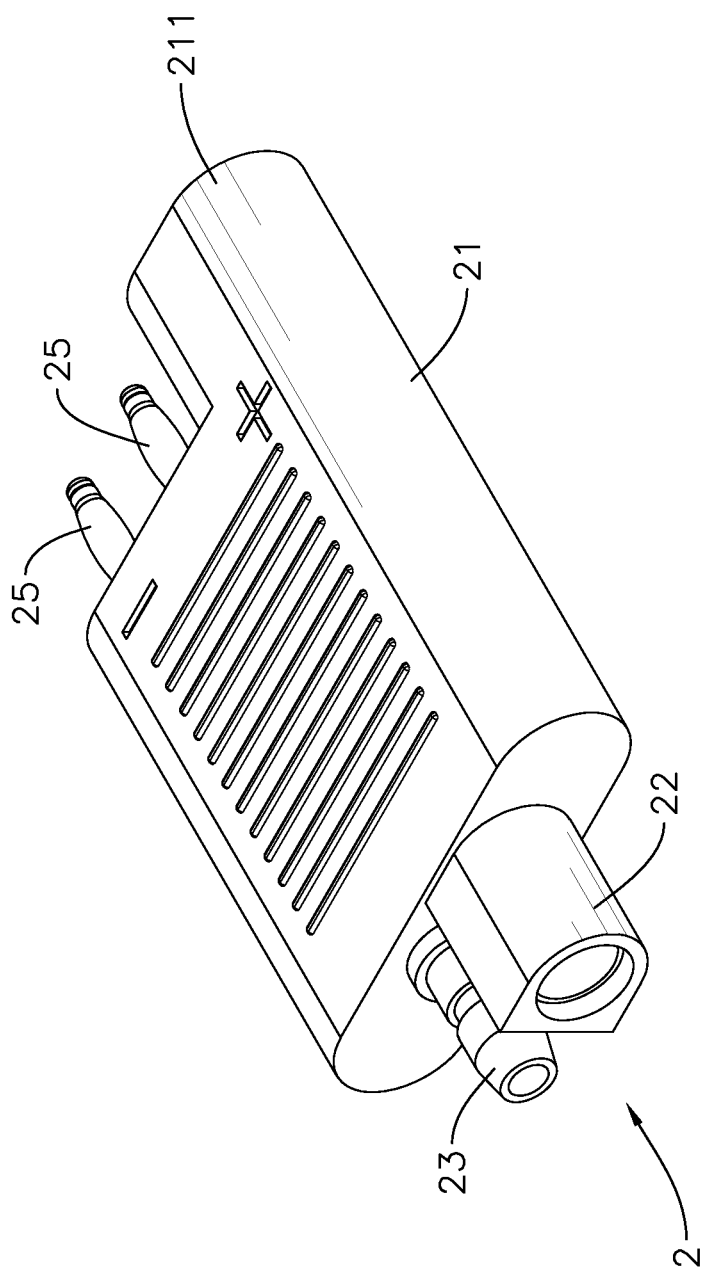
FIG. 2A and FIG. 2B are stereo diagrams of the battery connector adapter of the invention.
Figure 2B:
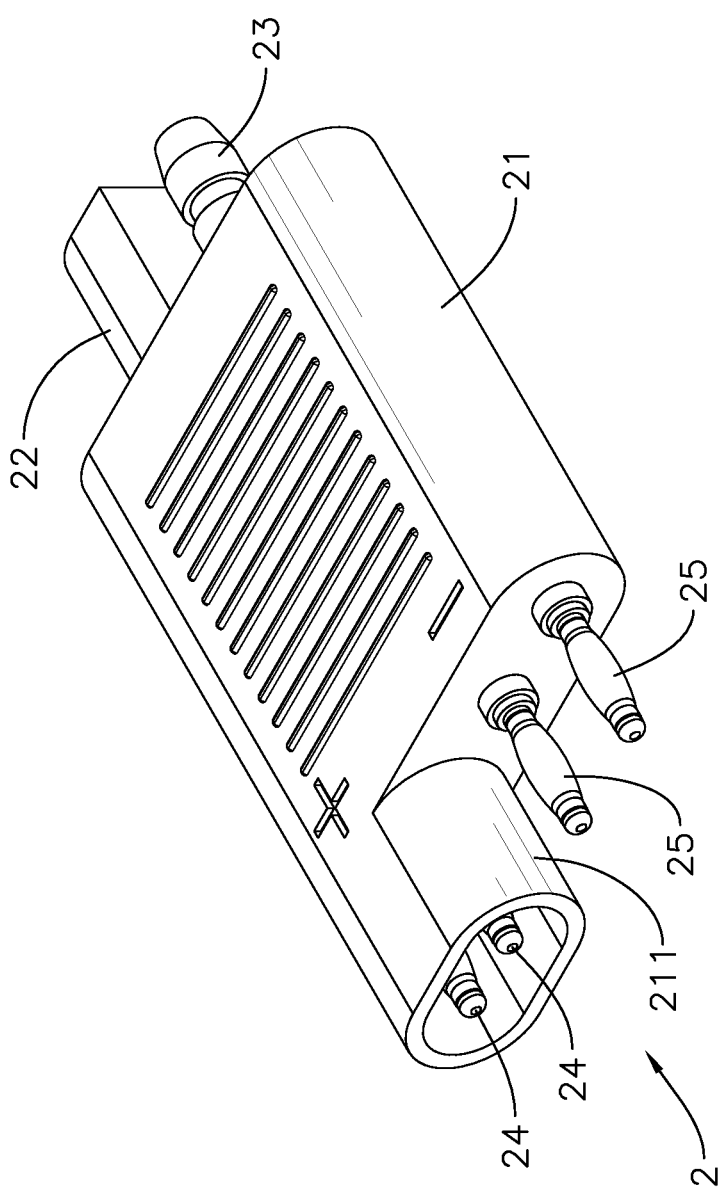
Figure 2C:
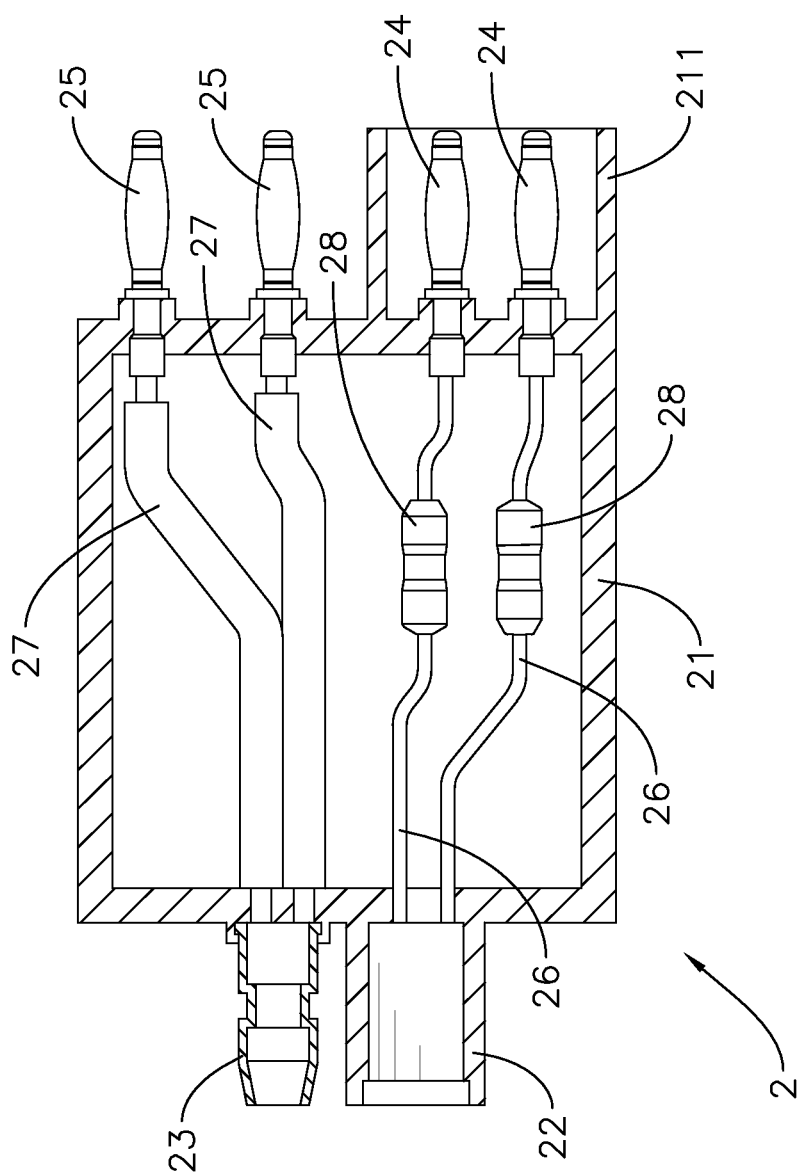
FIG. 2C is a profile diagram of the battery connector adapter of the invention.

Please refer to FIG. 2A to FIG. 2C, which are stereo diagrams and a profile diagram of the battery connector adapter of the invention. The battery connector adapter 2 includes a housing 21, a positive electrode terminal 22, a negative electrode terminal 23, two positive electrode connectors 24, and two negative electrode connectors 25. The positive electrode terminal 22, the negative electrode terminal 23, the two positive electrode connectors 24, and the two negative electrode connectors 25 are disposed in the housing 21. The two positive electrode connectors 24 are electrically connected to the positive electrode terminal 22 respectively by two first transmission lines 26, and the two negative electrode connectors 25 are electrically connected to the negative electrode terminal 23 respectively by two second transmission lines 27, wherein the two first transmission lines 26 and the two second transmission lines 27 are disposed in the housing 21.

The battery connector adapter 2 further includes two fuses 28, which are respectively electrically connected to the two first transmission lines 26 or respectively electrically connected to the two second transmission lines 27. The fuses 28 include resettable fuses or non-resettable resettable fuses. The battery connector adapter 2 further includes two fuse bases (not shown in the figure), which are connected to the two first transmission lines 26 or connected to the two second transmission lines 27. The two fuses 28 are disposed in the two fuse bases. Moreover, the two fuses 28 are detachably mounted in the fuse bases so that the two fuses 28 can be replaced when burned out.

The battery connector adapter 2 further includes a foolproof design. In details, in an embodiment of the invention, at least one projecting part 211 is disposed in the housing 21, wherein at least one of the positive electrode terminal 22, the negative electrode terminal 23, the two positive electrode connectors 24 and the two negative electrode connectors 25 is disposed in the at least one projecting part 211 so as to be clearly identified as different terminals or connectors by a user. Accordingly, the user can avoid mismatching the terminals or connectors and avoid a short circuit by simultaneously touching the positive terminal and the negative terminal. In the embodiment, the two positive electrode connectors 24 are disposed in the at least one projecting part 211. In another embodiment of the invention, the positive electrode terminal 22, the negative electrode terminal 23, the two positive electrode connectors 24, and the two negative electrode connectors 25 can be disposed in the housing 21, that is, all of the terminals and the connectors can be disposed inside the housing 21 instead of protruding out of the housing. In other words, in the embodiment of the invention, the positive electrode terminal 22, the negative electrode terminal 23, the two positive electrode connectors 24 and the two negative electrode connectors 25 can be disposed in an exterior of the housing 21 or disposed in an interior of the housing 21. Accordingly, the invention is not limited thereto. In addition, the housing 21 of the battery connector adapter 2 includes a waterproofing material, which can avoid a short circuit when water is sprayed to the battery connector adapter 2.

Figure 2D:
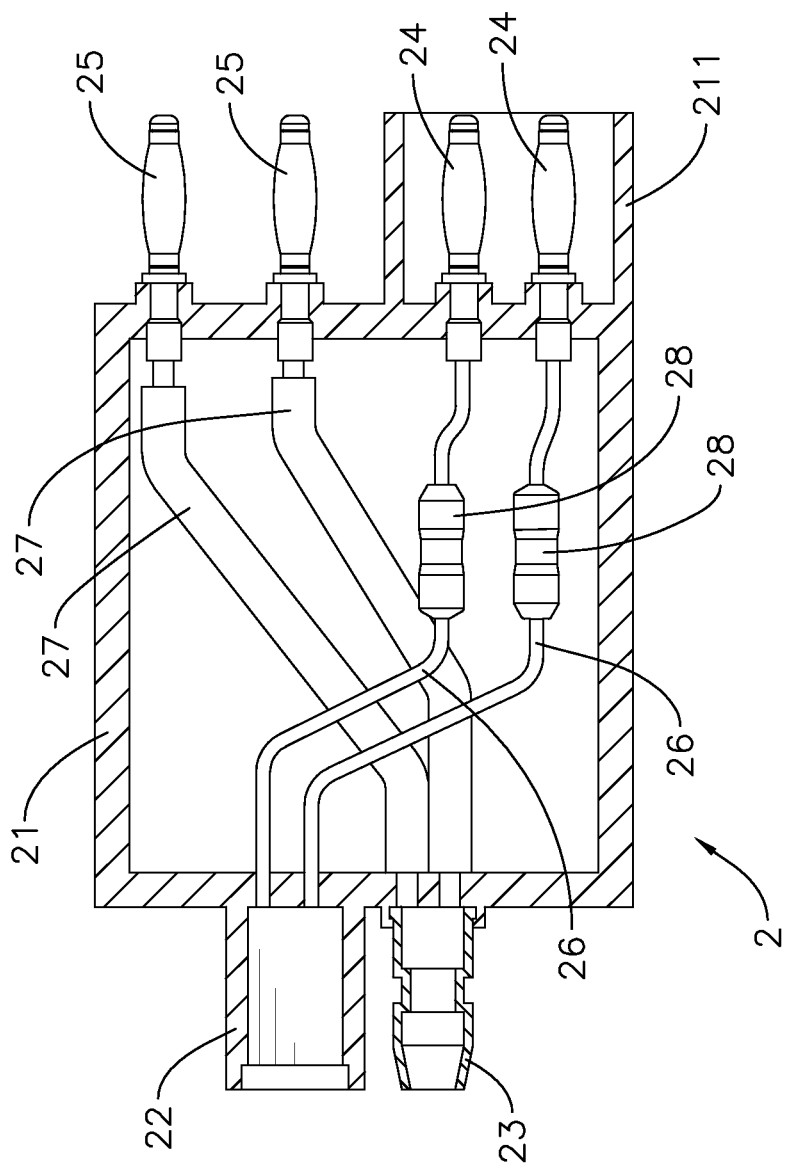
FIG. 2D is a profile diagram of the battery connector adapter in another embodiment of the invention.

Please refer to FIG. 2D, which is a profile diagram of the battery connector adapter in another embodiment of the invention. In the embodiment, the functions of all the elements are the same as the functions of the elements of the battery connector adapter 2 in FIG. 2C, but the difference is that the positive electrode terminal 22, the negative electrode terminal 23, the two positive electrode connectors 24, and the two negative electrode connectors 25 are disposed in different positions of the housing 21. Therefore, the positions of the two first transmission lines 26 and the two second transmission lines 27 disposed in the housing 21 respectively correspond to the positions of the two positive electrode connectors 24 and the two negative electrode connectors 25 and are disposed across in the housing 21, as shown in FIG. 2D.

Figure 3A:
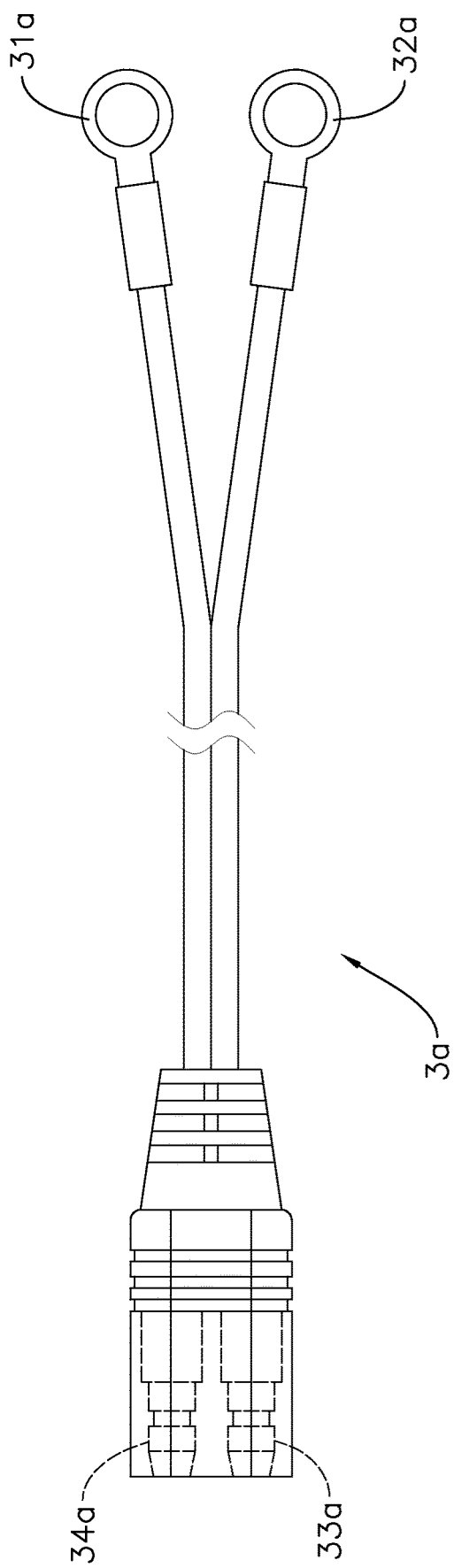
FIG. 3A is a schematic diagram of a wire set connected to the battery connector adapter.
Figure 3B:
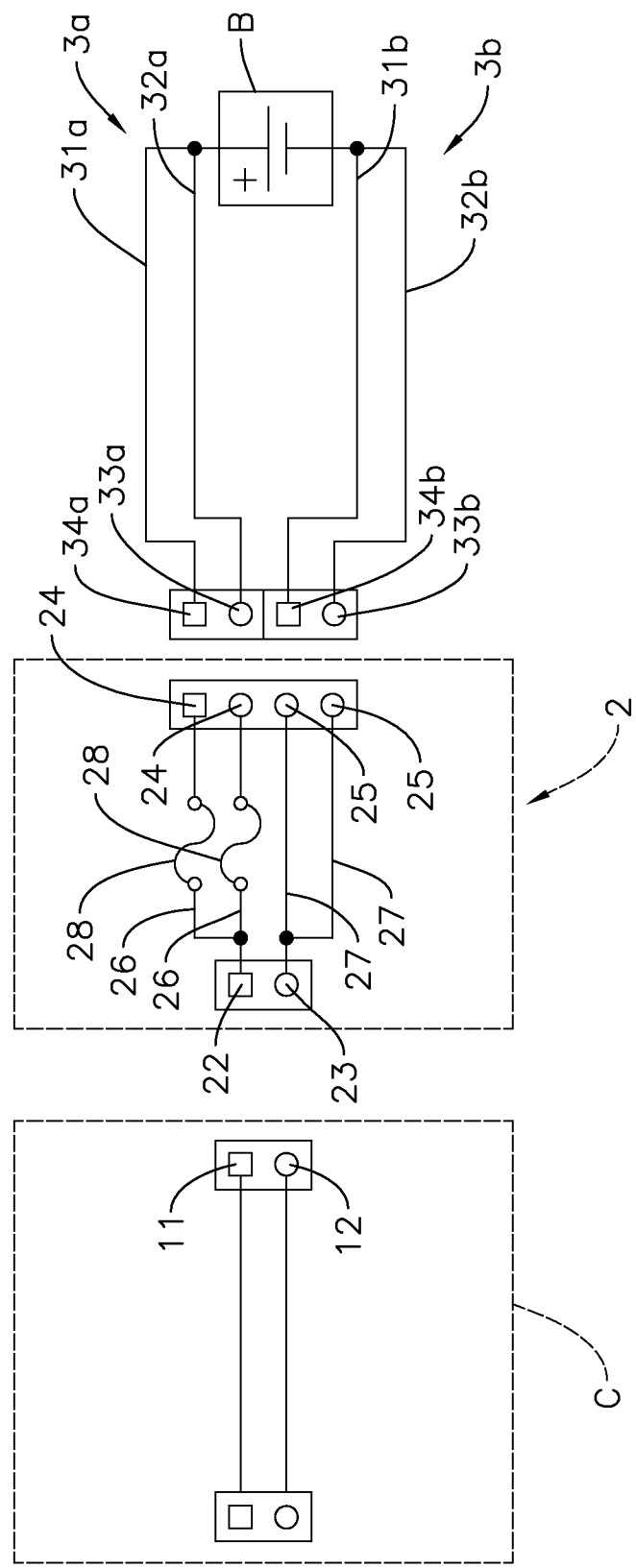
FIG. 3B is a circuit diagram showing that the battery connector adapter is connected to the rechargeable battery by the wire set and the battery charger.
Figure 3C:
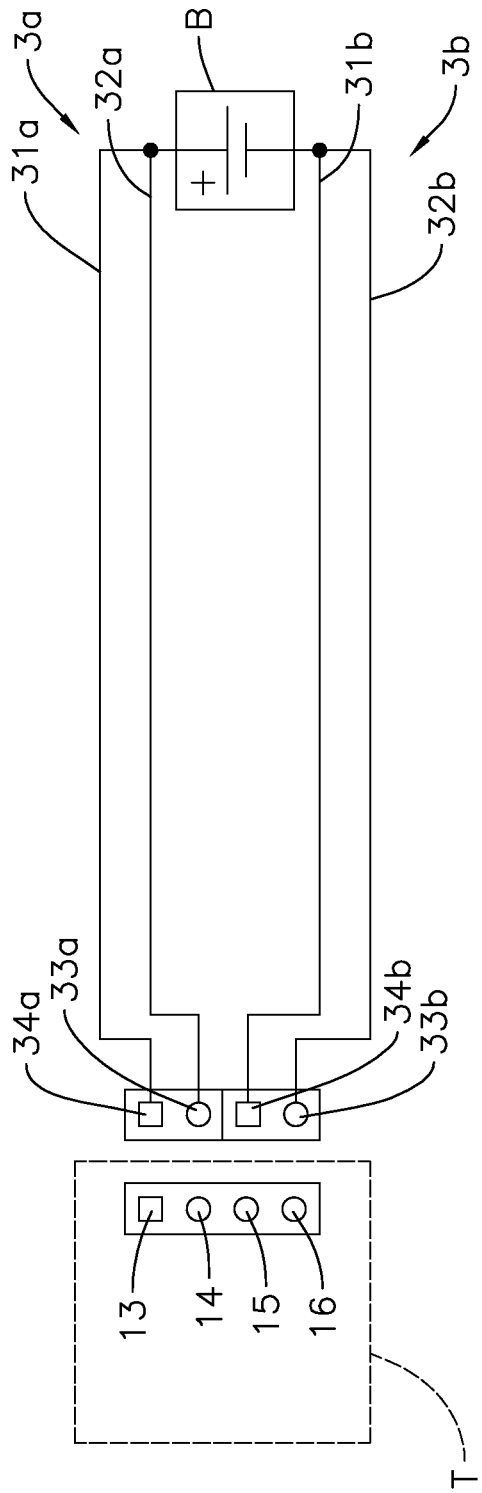
FIG. 3C is a circuit diagram showing that the battery connector adapter is connected to the test instrument by the wire set.

Please refer to FIG. 3A, FIG. 3B and FIG. 3C, FIG. 3A is a schematic diagram of a wire set connected to the battery connector adapter and the rechargeable battery, FIG. 3B is a circuit diagram showing that the battery connector adapter is connected to the rechargeable battery B by the wire set and the battery charger C, and FIG. 3C is a circuit diagram showing that the battery connector adapter is connected to the test instrument T by the wire set. The wire set 3a and wire set 3b are respectively connected between the positive terminal and the negative terminal of the rechargeable battery B and the two positive electrode connectors 24 and the two negative electrode connectors 25 of the battery connector adapter 2. The wire set 3a and the wire set 3b have the same structure, and therefore, only the wire set 3a is labeled in FIG. 3A.

As shown in FIG. 3B, the wire set 3a has two terminals 31a, 32a and two polarity connectors 33a, 34a. The wire set 3b has two terminals 31b, 32b and two polarity connectors 33b, 34b. When the user wants to charge the rechargeable battery B, the two terminals 31a, 32a of the wire set 3a are connected to the positive terminal of the rechargeable battery B, and the two polarity connectors 33a, 34a of the wire set 3a are connected to the two positive electrode connectors 24 of the battery connector adapter 2. The two terminals 31b, 32b of the wire set 3b are connected to the negative terminal of the rechargeable battery B, and the two polarity connectors 33b, 34b of the wire set 3b are connected to the two negative electrode connectors 25 of the battery connector adapter 2. The positive electrode terminal 22 and the negative electrode terminal 23 of the battery connector adapter 2 are respectively connected to the positive terminal 11 and the negative terminal 12 of the battery charger C. Accordingly, the connection between the rechargeable battery B and the battery charger C is completed by the battery connector adapter 2 and the wire sets 3a, 3b.

Please refer to FIG. 3C, when the user wants to test the rechargeable battery B, the wire sets 3a, 3b respectively connected to the positive terminal and the negative terminal of the rechargeable battery B are stationary, that is, the two terminals 31a, 32a of the wire set 3a and the two terminals 31b, 32b of the wire set 3b maintain to be connected to the positive terminal and the negative terminal of the rechargeable battery B instead of being pulled from the rechargeable battery B. The user only needs to remove the battery connector adapter 2 connected to the two polarity connectors 33a, 34a, 33b, 34b of the wire sets 3a, 3b, and respectively connect the two polarity connectors 33a, 34a, 33b, 34b of the wire sets 3a, 3b to the positive terminal and the negative terminal 13, 14, 15, 16 of the test instrument T to perform the connection for the test instrument T. Accordingly, the connection between the rechargeable battery B and the test instrument T is directly completed by the wire sets 3a, 3b.

Figure 4:
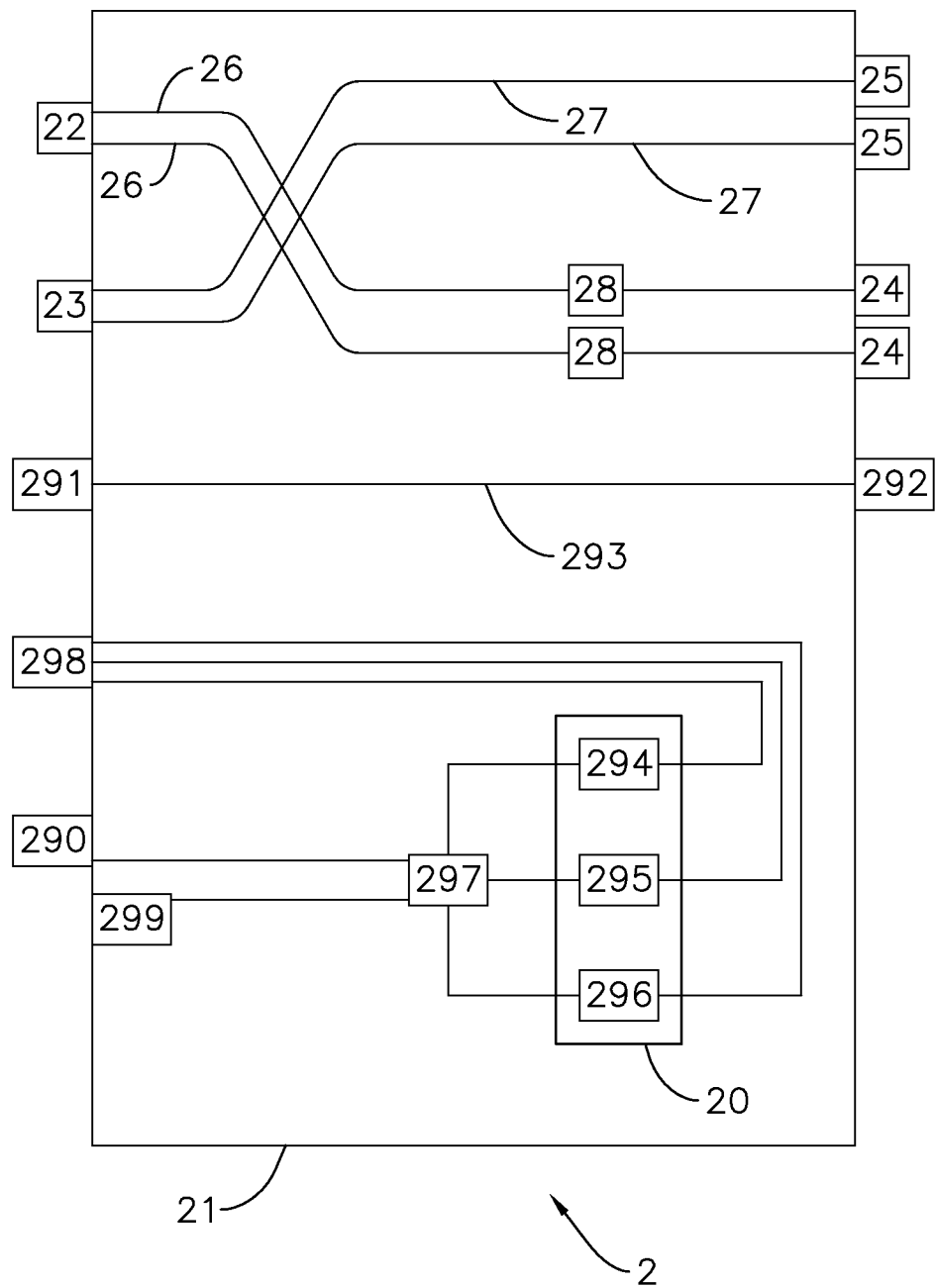
FIG. 4 is a block diagram of the battery connector adapter of the invention.

Please refer to FIG. 4, which is a block diagram of the battery connector adapter of the invention. In the embodiment, the battery connector adapter 2 can further increase amounts of the terminals and the connectors. In details, the battery connector adapter 2 includes a thermal sensing terminal 291 and a thermal sensing connector 292, connected to a peripheral temperature display (not shown in the figure), which are used to display a temperature value of the rechargeable battery B while the battery charger C or the test instrument T is connected to the rechargeable battery B. The thermal sensing terminal 291 can be disposed in the housing 21 or disposed in the rechargeable battery B. The thermal sensing connector 292 can be disposed in the housing 21 and connected to the thermal sensing terminal 291 by at least one third transmission line 293. The at least one third transmission line 293 is disposed in the housing 21. Furthermore, in the embodiment of the invention, the positive electrode terminal 22 and the negative electrode terminal 23 are a SAE terminal, and the two positive electrode connectors 24 and the two negative electrode connectors 25 are a banana connector. The invention is not limited thereto.

As mentioned above, the battery connector adapter 2 includes a rechargeable battery detecting circuit 20, which is used to detect the voltage, the current, the temperature, the internal resistance and the conductance of the rechargeable battery B while the rechargeable battery detecting circuit 20 is electrically connected to the rechargeable battery B. The rechargeable battery detecting circuit 20 includes a thermal indicator 294, which is used to detect the temperature of the rechargeable battery B while the battery charger C charges the rechargeable battery B. The battery connector adapter 2 includes a current indicator 295, which is used to detect the current of the rechargeable battery B while the battery charger C charges the rechargeable battery B. The battery connector adapter 2 includes a voltage indicator 296, which is used to detect the voltage of the rechargeable battery B while the battery charger C charges the rechargeable battery B.

As mentioned above, the battery connector adapter 2 includes a wireless communication element 297, disposed in the housing 21 and electrically connected to the thermal indicator 294 of the rechargeable battery detecting circuit 20. The wireless communication element 297 is used to wirelessly transmit the temperature of the rechargeable battery B to a smart device, a cloud network or a server. The wireless communication element 297 is electrically connected to the current indicator 295 of the rechargeable battery detecting circuit 20 to wirelessly transmit the current of the rechargeable battery B to the smart device, the cloud network or the server. The wireless communication element 297 is electrically connected to the voltage indicator of the rechargeable battery detecting circuit 20 to wirelessly transmit the voltage of the rechargeable battery B to the smart device, the cloud network or the server. In the embodiment of the invention, the technology for wireless transmission includes ZeeBee/bluetooth/wifi/GPRS/GSM/WiMAX/Dedicated Short Range Communications (DSRC)/Wireless Access in Vehicular Environments (WAVE), and so on. The smart device includes the smart phone and the tablet. The server includes the desktop and the notebook. Accordingly, the user can use the wireless transmission technology, the smart phone and the server to remotely monitor the state of the rechargeable battery B. Furthermore, the battery connector adapter 2 includes a hard-wire communication element 298, electrically connected to the thermal indicator 294, the current indicator 295 and the voltage indicator 296 mentioned above, is used to display the value of voltage, the value of current and the value of the temperature of the rechargeable battery B. It should be noted that there is only one hard-wire communication element 298 in FIG. 4, simultaneously electrically connected to the voltage indicator 296, the current indicator 295 and the thermal indicator 294, but in fact, the battery connector adapter 2 can include a plurality of hard-wire communication elements 298, separately electrically connected to the voltage indicator 296, the current indicator 295, and the thermal indicator 294. The invention is not limited thereto. In the embodiment of the invention, the technology for hard-wire communication includes Controller Area Network (CAN BUS), Local Interconnect Network (LIN BUS), Flex Ray, Media Oriented Systems Transport (MOST), USB, General Purpose Input Output (GPIO), RS232, RS485 and Inter-Integrated Circuit (IIC Bus).

As mentioned above, the battery connector adapter 2 further includes an indicator light 299, disposed in the housing 21 and electrically connected to the rechargeable battery detecting circuit 20. The indicator light 299 is used to display the state whether the battery connector adapter 2 is successfully electrically connected to the rechargeable battery B. or is used to send out an alert signal to warn the user while the rechargeable battery detecting circuit 20 is electrically connected to the rechargeable battery B and the rechargeable battery B cannot be successfully charged. In addition, the indicator light 299 includes a monitor (not shown in the figure), electrically connected to the wireless communication element 297, the voltage indicator 296, the current indicator 295 and the thermal indicator 294 of the rechargeable battery detecting circuit 20. The monitor is used to display the state that the battery connector adapter 2 is wirelessly connected to the smart device, the voltage value, the current value, the temperature value, the internal resistance value and the conductance value of the rechargeable battery B.

As mentioned above, the battery connector adapter 2 further includes a switch 290, disposed in the housing 21 and electrically connected to the wireless communication element 297. The wireless communication element 297 controls the switch 290 by a wireless signal to swiftly turn on or turn off the rechargeable battery B electrically connected to the battery connector adapter 2 and wirelessly transmits the state that the rechargeable battery B is turned on or turned off to the smart device, the cloud network, or the server. In another embodiment of the invention, the switch 290, disposed in the housing 21 and disconnected from the wireless communication element 297, is used to swiftly turn on and turn off the battery connector adapter 2. The method for turning on and turning off the rechargeable battery B includes the manual control and the remote control performed by the smart device or the server mentioned above.

In summary, the battery connector adapter of the invention provides a design of the adaptor, which facilitates the user not to repeatedly plug the wire set in the rechargeable battery and pull the wire set from the rechargeable battery. Instead, the wire set can be fixed on the positive electrode terminal and the negative electrode terminal of the rechargeable battery. Therefore, the actions for plugging the wire set in and pulling the wire set from the rechargeable battery are easy to perform by connecting the battery connector adapter of the invention. After that, the user can immediately switch the connection to the battery charger C or the test instrument T so that the user can swiftly perform charging and testing the rechargeable battery. Therefore, the accuracy for testing the rechargeable battery can be sustained.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A battery connector adapter, including:
   a housing;
   a positive electrode terminal, disposed in the housing;
   a negative electrode terminal, disposed in the housing;
   two positive electrode connectors, disposed in the housing and electrically connected to the positive electrode terminal respectively by two first transmission lines; and
   two negative electrode connectors, disposed in the housing and electrically connected to the negative electrode terminal respectively by two second transmission lines;
   wherein the two first transmission lines and the two second transmission lines are disposed in the housing.

2. The battery connector adapter as claimed in claim 1, further including two fuses, respectively electrically connected to the two first transmission lines or respectively electrically connected to the two second transmission lines.

3. The battery connector adapter as claimed in claim 2, wherein the two fuses include resettable fuses or non-resettable fuses.

4. The battery connector adapter as claimed in claim 2, further including two fuse bases, respectively electrically connected to the two first transmission lines or respectively electrically connected to the two second transmission lines; wherein the two fuses are disposed in the two fuse bases.

5. The battery connector adapter as claimed in claim 1, wherein the housing includes a waterproofing material.

6. The battery connector adapter as claimed in claim 1, wherein the housing includes at least one projecting part; wherein one of the positive electrode terminal, the negative electrode terminal, the two positive electrode connectors, and the two negative electrode connectors is disposed in the at least one projecting part.

7. The battery connector adapter as claimed in claim 1, wherein one of the positive electrode terminal, the negative electrode terminal, the two positive electrode connectors, and the two negative electrode connectors is disposed in the housing.

8. The battery connector adapter as claimed in claim 1, further including:
a thermal sensing terminal, disposed in the housing; and
a thermal sensing connector, disposed in the housing and electrically connected to the thermal sensing terminal by at least one third transmission line; wherein the at least one third transmission line is disposed in the housing.

9. The battery connector adapter as claimed in claim 1, further including:
a thermal sensing terminal, for contacting a rechargeable battery; and
a thermal sensing connector, disposed in the housing and electrically connected to the thermal sensing terminal by at least one third transmission line, wherein the at least one third transmission line is disposed in the housing.

10. The battery connector adapter as claimed in claim 1, further including a rechargeable battery detecting circuit, for being electrically connected to a rechargeable battery to detect a voltage, a current, a temperature, an internal resistance and a conductance of the rechargeable battery.

11. The battery connector adapter as claimed in claim 10, wherein the rechargeable battery detecting circuit includes a thermal indicator, for detecting the temperature of the rechargeable battery when the rechargeable battery is charged.

12. The battery connector adapter as claimed in claim 10, wherein the rechargeable battery detecting circuit includes a current indicator, for detecting the current of the rechargeable battery when the rechargeable battery is charged.

13. The battery connector adapter as claimed in claim 10, wherein the rechargeable battery detecting circuit includes a voltage indicator, for detecting the voltage of the rechargeable battery when the rechargeable battery is charged.

14. The battery connector adapter as claimed in claim 10, further including an indicator light, electrically connected to the rechargeable battery detecting circuit for displaying a value of the voltage, a value of the current, a value of the temperature, a value of the internal resistance, and a value of the conductance of the rechargeable battery.

15. The battery connector adapter as claimed in claim 10, further including a wireless communication element, disposed in the housing, and electrically connected to the rechargeable battery detecting circuit for wirelessly transmitting a signal of the temperature, a signal of the current and a signal of the voltage of the rechargeable battery to a smart device, a cloud network or a server.

16. The battery connector adapter as claimed in claim 15, further including a switch, disposed in the housing, and electrically connected to the wireless communication element; wherein the wireless communication element controls the switch by a wireless signal to turn on or turn off the rechargeable battery, and wirelessly transmits a value of the internal resistance, a value of the conductance, a value of the temperature, a value of the current and a value of the voltage of the rechargeable battery to the smart device, the cloud network or the server.

17. The battery connector adapter as claimed in claim 1, further including a switch, disposed in the housing for turning on or turning off the rechargeable battery.

* * * * *